Oct. 22, 1946.   R. J. A. INGOUF ET AL   2,409,864
GAUGE
Filed May 20, 1943

Inventors
Robert J. A. Ingouf and
Joseph H. Davis
By Vernon M. Dorsey
Attorney

Patented Oct. 22, 1946

2,409,864

UNITED STATES PATENT OFFICE 2,409,864

GAUGE

Robert J. A. Ingouf and Joseph Hilliard Lewis, Kingsport, Tenn., assignors to Blue Ridge Glass Corporation, Kingsport, Tenn., a corporation of New York Application May 20, 1943, Serial No. 487,772

2 Claims. (Cl. 33—168)

It has been proposed to use glass as a material from which to make gauges instead of steel as has been the prior practice. Glass lends itself to this use due to its hardness and resistance to wear, in these respects approximating steel. It suffers, however, in its great frangibility so that its breakage in use would be excessive.

With a view of overcoming this last named defect we propose to temper the glass in order to strengthen it. Thus, we are enabled to cheaply produce efficient gauges whether in the form of snap gauges or templates, by fashioning a suitable blank of glass to the approximate contour and size, and then tempering the glass to increase its strength and then finish it at its critical faces or points to the desired dimensions by grinding or drilling. As it is difficult to work tempered glass without causing fracture thereof, we further propose to leave the portions of the gauge adjacent to the critical points thereof untempered so that the gauge may be ground or drilled to finish dimensions after the tempering.

Referring to the accompanying drawing which represents articles made in accordance with this invention, Figure 1 represents a blank for a snap gauge in accordance with our ideas;

Figure 1:
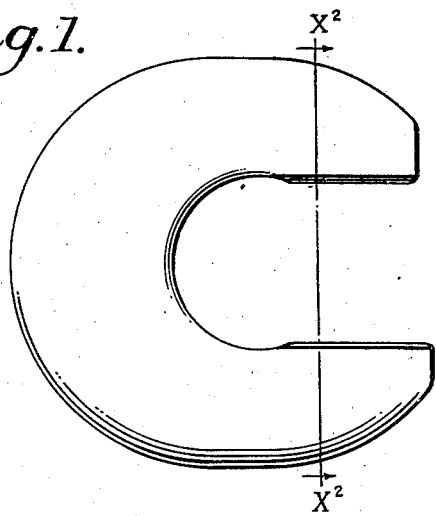
Figure 3:
Figure 3 represents the same article in its finished condition, the shaded areas being untempered.
Figure 2:
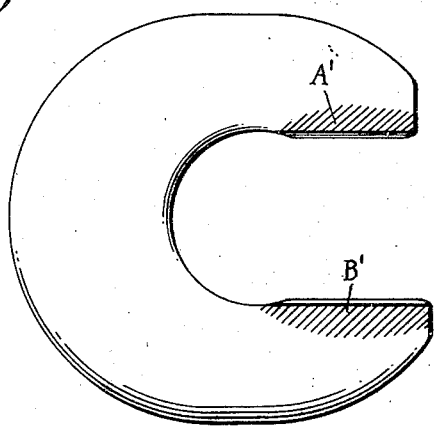
Figure 2 is a section on line X—2, X—2 of Figure 1.

In the production of a snap gauge, such as shown in Figures 1, 2 and 3, a suitable piece of fabricated glass (polished or otherwise) is shaped by known processes to the approximate contour of the finished gauge, the gap between the anvils being slightly less than that desired in the finished article. The blank so formed is then tempered in any of the ways known to the art, the areas A' and B' adjacent to the anvils being left untempered. This may be accomplished by masking such areas either in the process of heating the blank preparatory to tempering or masking them in the subsequent sudden chilling. Both methods are described in United States Patent No. 2,244,715 of June 10, 1941 to Bernard Long, and hence need not be further elaborated here.

Figure 4:
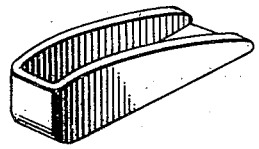
Figure 4 is a view of a mask suitable for use in fabricating the article shown in Figure 3.

Figure 4 shows a mask suitable for this purpose of localizing the tempering, consisting of a sheet of asbestos paper folded into U form, to be slipped over the edge of the blank adjacent to the critical gauge surface.

A blank so tempered may then have the edges of its gap ground to the exact dimensions desired without the damage that would result from an attempt to grind off the edges of the blank if tempered.

Figure 5:
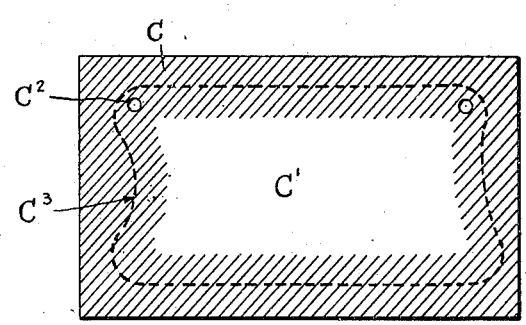
Figure 5 is a plan view of a template embodying our invention.

Our invention is also applicable to the production of templates. Such a template is shown in Figure 5. Here the blank has the desired strength imparted to it by tempering its major or intermediate portion C', the edge portions, shown shaded in said figure, which we term the control portion C, being left in its annealed condition. Control holes $C^2$ may be drilled in the untempered or annealed portion of the blank and such portions may be ground or otherwise shaped to the desired contour as suggested by the exemplary dotted line $C^3$.

Having thus described our invention what we claim and desire to secure by United States Letters Patent is:

1. A gauge of glass having portions thereof tempered and having those portions thereof adjacent to control points untempered.

2. A snap gauge of glass having its greater portion tempered and having its anvil faces untempered.

ROBERT J. A. INGOUF.
JOSEPH HILLIARD LEWIS.